US012682426B2

(12) United States Patent
Dastjerdi et al.

(10) Patent No.: US 12,682,426 B2
(45) Date of Patent: Jul. 14, 2026

(54) ARTIFICIAL INTELLIGENCE TECHNIQUES FOR EXTRAPOLATING HDR PANORAMAS FROM LDR LOW FOV IMAGES

(71) Applicant: Adobe Inc., San Jose, CA (US)

(72) Inventors: Mohammad Reza Karimi Dastjerdi, Quebec (CA); Yannick Hold-Geoffroy, Quebec City (CA); Sai Bi, San Jose, CA (US); Jonathan Eisenmann, San Francisco, CA (US); Jean-François Lalonde, Quebec (CA)

(73) Assignee: Adobe Inc., San Jose, CA (US)

( * ) Notice: Subject to any disclaimer, the term of this patent is extended or adjusted under 35 U.S.C. 154(b) by 342 days.

(21) Appl. No.: 18/238,290

(22) Filed: Aug. 25, 2023

(65) Prior Publication Data

US 2024/0127402 A1     Apr. 18, 2024

Related U.S. Application Data

(60) Provisional application No. 63/456,219, filed on Mar. 31, 2023, provisional application No. 63/416,915, filed on Oct. 17, 2022.

(51) Int. Cl.
| | |
|---|---|
| *G06T 5/50* | (2006.01) |
| *G06T 5/70* | (2024.01) |
| *G06T 15/50* | (2011.01) |

(52) U.S. Cl.
CPC ................. *G06T 5/50* (2013.01); *G06T 5/70* (2024.01); *G06T 15/506* (2013.01);
(Continued)

(58) Field of Classification Search
CPC .......... G06T 5/50; G06T 15/506; G06T 5/70; G06T 2207/20208; G06T 5/90;
(Continued)

(56) References Cited

U.S. PATENT DOCUMENTS

| | | |
|---|---|---|
| 10,936,909 B2 | 3/2021 | Sunkavalli et al. |
| 2018/0359416 A1 | 12/2018 | Hold-Geoffroy et al. |
| 2021/0073955 A1 | 3/2021 | Zhang et al. |

FOREIGN PATENT DOCUMENTS

| | | |
|---|---|---|
| WO | 2021042208 A1 | 3/2021 |

OTHER PUBLICATIONS

Gardner, M., Sunkavalli, K., Yumer, E., Shen, X., Gambaretto, E., Gagné, C., & Lalonde, J. (2017). Learning to predict indoor illumination from a single image. ACM Transactions on Graphics (TOG), 36, 1-14 (Year: 2017).*
(Continued)

*Primary Examiner* — Matthew C Bella

*Assistant Examiner* — Janice E. Vaz

(74) *Attorney, Agent, or Firm* — Kilpatrick Townsend & Stockton LLP

(57) ABSTRACT

In some examples, a computing system accesses a field of view (FOV) image that has a field of view less than 360 degrees and has low dynamic range (LDR) values. The computing system estimates lighting parameters from a scene depicted in the FOV image and generates a lighting image based on the lighting parameters. The computing system further generates lighting features generated the lighting image and image features generated from the FOV image. These features are aggregated into aggregated features and a machine learning model is applied to the image features and the aggregated features to generate a panorama image having high dynamic range (HDR) values.

17 Claims, 9 Drawing Sheets

(52) U.S. Cl.

CPC ................... *G06T 2200/24* (2013.01); *G06T 2207/20081* (2013.01); *G06T 2207/20084* (2013.01); *G06T 2207/20092* (2013.01); *G06T 2207/20208* (2013.01)

(58) Field of Classification Search

CPC ................ G06T 3/4046; G06T 3/4038; G06T 2207/20081; G06T 2207/20084; G06N 3/0475; G06V 10/82

See application file for complete search history.

(56) References Cited

OTHER PUBLICATIONS

Zhu et al., Spatially-Varying Outdoor Lighting Estimation from Intrinsics, Vision and Pattern Recognition (CVPR), Apr. 2021, pp. 12834-12842 (Year: 2021).*

GB Application No. GB2314638.4 Search and Examination Report, Mar. 4, 2024, 5 pages.

Akimoto et al., 360-Degree Image Completion by Two-Stage Conditional Gans, IEEE International Conference on Image Processing (ICIP), Sep. 22-25, 2019, 4 pages.

Akimoto et al., Diverse Plausible 360-Degree Image Outpainting for Efficient 3DCG Background Creation, IEEE/CVF Conference on Computer Vision and Pattern Recognition (CVPR), Jun. 18-24, 2022, pp. 11441-11450.

Barnes et al., PatchMatch: A Randomized Correspondence Algorithm for Structural Image Editing, ACM Transactions on Graphics, vol. 28, No. 3, Jul. 27, 2009, 10 pages.

Barron et al., Shape, Illumination, and Reflectance from Shading, IEEE Transactions on Pattern Analysis and Machine Intelligence, vol. 37, No. 8, Aug. 2015, 19 pages.

Cheng et al., Learning Scene Illumination by Pairwise Photos from Rear and Front Mobile Cameras, Computer Graphics Forum, vol. 37, No. 7, Oct. 2018, 9 pages.

Dastjerdi et al., Guided Co-Modulated GAN for 360° Field of View Extrapolation, International Conference on 3D Vision (3DV), Available Online at: https://arxiv.org/pdf/2204.07286.pdf, Aug. 23, 2022, 11 pages.

Debevec, Rendering Synthetic Objects into Real Scenes: Bridging Traditional and Image-Based Graphics with Global Illumination and High Dynamic Range Photography, SIGGRAPH '98: Proceedings of the 25th Annual Conference on Computer Graphics and Interactive Techniques, Jul. 1998, 10 pages.

Efros et al., Image Quilting for Texture Synthesis and Transfer, SIGGRAPH '01: Proceedings of the 28th Annual Conference on Computer Graphics and Interactive Techniques, Aug. 2001, 6 pages.

Efros et al., Texture Synthesis By Non-Parametric Sampling, Proceedings of the Seventh IEEE International Conference on Computer Vision, Sep. 20-27, 1999, 6 pages.

Eilertsen et al., HDR Image Reconstruction from a Single Exposure Using Deep CNNs, ACM Transactions on Graphics, vol. 36, No. 6, Nov. 20, 2017, 15 pages.

Endo et al., Deep Reverse Tone Mapping, ACM Transactions on Graphics, vol. 36, No. 6, Nov. 20, 2017, pp. 177:1-177:10.

Gardner et al., Deep Parametric Indoor Lighting Estimation, Available Online at: https://openaccess.thecvf.com/content_ICCV_2019/papers/Gardner_Deep_Parametric_Indoor_Lighting_Estimation_ICCV_2019_paper.pdf, Oct. 2019, pp. 7175-7183.

Gardner et al., Learning to Predict Indoor Illumination from a Single Image, ACM Transactions on Graphics, vol. 36, No. 6, Nov. 21, 2017, 14 pages.

Garon et al., Fast Spatially-Varying Indoor Lighting Estimation, 2019 IEEE/CVF Conference on Computer Vision and Pattern Recognition (CVPR), Jun. 2019, pp. 6908-6917.

Griffiths et al., OutCast: Outdoor Single-Image Relighting with Cast Shadows, Computer Graphics Forum, vol. 41, No. 2, Apr. 20, 2022, 20 pages.

Guillemot et al., Image Inpainting: Overview and Recent Advances, IEEE Signal Processing Magazine, vol. 31, No. 1, Jan. 2014, pp. 127-144.

Hara et al., Spherical Image Generation from a Single Image by Considering Scene Symmetry, Thirty-Fifth AAAI Conference on Artificial Intelligence (AAAI-21), vol. 35, No. 2, May 18, 2021, pp. 1513-1521.

Hartley et al., Multiple View Geometry in Computer Vision, Cambridge University Press, ISBN:0521540518, Second Edition, 2004, 673 pages.

Heusel et al., GANs Trained by a Two Time-Scale Update Rule Converge to a Local Nash Equilibrium, Proceedings of the 31st International Conference on Neural Information Processing Systems, Available Online at: https://dl.acm.org/doi/pdf/10.5555/3295222.3295408, Dec. 2017, pp. 1-12.

Hold-Geoffroy et al., Deep Outdoor Illumination Estimation, IEEE Conference on Computer Vision and Pattern Recognition (CVPR), 2017, pp. 7312-7321.

Hold-Geoffroy et al., Deep Sky Modeling for Single Image Outdoor Lighting Estimation, IEEE/CVF Conference on Computer Vision and Pattern Recognition (CVPR), Jun. 2019, pp. 6927-6935.

Isola et al., Image-to-Image Translation with Conditional Adversarial Networks, Available Online at: https://arxiv.org/abs/1611.07004, Nov. 22, 2017, 17 pages.

Karras et al., A Style-Based Generator Architecture for Generative Adversarial Networks, Available Online at: https://arxiv.org/pdf/1812.04948.pdf, Mar. 29, 2019, pp. 1-12.

Kulkarni et al., 360FusionNeRF: Panoramic Neural Radiance Fields with Joint Guidance, Available Online at: https://arxiv.org/pdf/2209.14265.pdf, Sep. 28, 2022, pp. 1-8.

Lalonde et al., Estimating the Natural Illumination Conditions from a Single Outdoor Image, International Journal of Computer Vision, vol. 98, No. 2, Jun. 1, 2012, pp. 123-145.

Lalondew et al., Lighting Estimation in Outdoor Image Collections, 2014 2nd International Conference on 3D Vision, Dec. 8-11, 2014, 8 pages.

Lalonde et al., The Laval HDR Sky Database, Available at http://www.hdrdb.com/, 2016, 2 pages.

Lalonde et al., What Do the Sun and the Sky Tell US About the Camera?, International Journal of Computer Vision, vol. 88, No. 1, May 2010, pp. 24-51.

Legendre et al., DeepLight: Learning Illumination for Unconstrained Mobile Mixed Reality, Computer Vision and Pattern Recognition, Available online at: https://arxiv.org/pdf/1904.01175.pdf, Apr. 2, 2019, 11 pages.

Li et al., Inverse Rendering for Complex Indoor Scenes: Shape, Spatially-varying Lighting and SVBRDF from a Single Image, Computer Vision and Pattern Recognition, Available online at: https://arxiv.org/pdf/1905.02722.pdf, May 7, 2019, 18 pages.

Li et al., Physically-based Editing of Indoor Scene Lighting from a Single Image, Computer Vision and Pattern Recognition, Available online at: https://arxiv.org/pdf/2205.09343.pdf, Jul. 23, 2022, 35 pages.

Liu et al., Single-Image HDR Reconstruction by Learning to Reverse the Camera Pipeline, Image and Video Processing, Available online at: https://arxiv.org/pdf/2004.01179.pdf, Apr. 2, 2020, 10 pages.

Mandl et al., Learning Lightprobes for Mixed Reality Illumination, 2017 IEEE International Symposium on Mixed and Augmented Reality (ISMAR), Available online at: https://www.cs.ubc.ca/~kmyi/pubs/2017/mandl2017learning/paper.pdf, Oct. 9, 2017, 8 pages.

Marnerides et al., ExpandNet: A Deep Convolutional Neural Network for High Dynamic Range Expansion from Low Dynamic Range Content, Computer Vision and Pattern Recognition, vol. 37, No. 2, Available online at: https://arxiv.org/pdf/1803.02266.pdf, Sep. 4, 2019, 13 pages.

Mildenhall et al., NeRF: Representing Scenes as Neural Radiance Fields for View Synthesis, Computer Vision and Pattern Recognition, Available online at: https://arxiv.org/pdf/2003.08934.pdf, Aug. 3, 2020, 25 pages.

Paszke et al., PyTorch: An Imperative Style, High-Performance Deep Learning Library, Advances in Neural Information Processing Systems 32, Dec. 3, 2019, pp. 8026-8037.

(56) References Cited

OTHER PUBLICATIONS

Radford et al., Learning Transferable Visual Models from Natural Language Supervision, Computer Vision and Pattern Recognition, Available online at: https://arxiv.org/pdf/2103.00020.pdf, Feb. 26, 2021, 42 pages.

Radford et al., Unsupervised Representation Learning with Deep Convolutional Generative Adversarial Networks, Under review as a conference paper at ICLR 2016, arXiv:1511.06434v2, Jan. 7, 2016, pp. 1-16.

Ramamoorthi et al., An Efficient Representation for Irradiance Environment Maps, SIGGRAPH '01: Proceedings of the 28th annual conference on Computer graphics and interactive techniques, Available online at: https://cseweb.ucsd.edu/~ravir/papers/envmap/envmap.pdf, Aug. 1, 2001, 4 pages.

Sengupta et al., Neural Inverse Rendering of an Indoor Scene from a Single Image, Computer Vision and Pattern Recognition, Available online at: https://arxiv.org/pdf/1901.02453.pdf, Sep. 14, 2019, 21 pages.

Shu et al., Neural Face Editing with Intrinsic Image Disentangling, IEEE Conference on Computer Vision and Pattern Recognition (CVPR'17), Available online at: https://arxiv.org/pdf/1704.04131v1.pdf, Apr. 13, 2017, 22 pages.

Somanath et al., HDR Environment Map Estimation for Real-Time Augmented Reality, Computer Vision and Pattern Recognition, Available online at: https://arxiv.org/pdf/2011.10687.pdf, Jul. 27, 2021, 16 pages.

Song et al., Neural Illumination: Lighting Prediction for Indoor Environments, Computer Vision and Pattern Recognition, Available online at: https://arxiv.org/pdf/1906.07370.pdf, Jun. 18, 2019, 17 pages.

Srinivasan et al., Lighthouse: Predicting Lighting Volumes for Spatially-coherent Illumination, 2020 IEEE/CVF Conference on Computer Vision and Pattern Recognition (CVPR), Available online at: https://arxiv.org/pdf/2003.08367.pdf, May 13, 2020, 13 pages.

Tang et al., Estimating Spatially-varying Lighting in Urban Scenes with Disentangled Representation, European Conference on Computer Vision, 2022, pp. 1-16.

Tewari et al., State of the Art on Neural Rendering, Computer Graphics Forum, vol. 39, No. 2, Available Online at: https://arxiv.org/pdf/2004.03805.pdf, Apr. 8, 2020, 27 pages.

Wang et al., High-Resolution Image Synthesis and Semantic Manipulation with Conditional GANs, Proceedings of the IEEE Conference on Computer Vision and Pattern Recognition, Aug. 20, 2018, pp. 8798-8807.

Wang et al., Learning Indoor Inverse Rendering with 3D Spatially-Varying Lighting, Available Online at: https://arxiv.org/pdf/2109.06061.pdf, Oct. 20, 2021, 10 pages.

Wang et al., Neural Light Field Estimation for Street Scenes with Differentiable Virtual Object Insertion, Available Online at: https://arxiv.org/pdf/2208.09480.pdf, Aug. 19, 2022, pp. 1-17.

Wang et al., StyleLight: HDR Panorama Generation for Lighting Estimation and Editing, Available Online at: https://arxiv.org/pdf/2207.14811.pdf, Jul. 29, 2022, pp. 1-22.

Weber et al., Editable Indoor Lighting Estimation, Available Online at: https://arxiv.org/pdf/2211.03928.pdf, Nov. 2022, pp. 1-16.

Wiles et al., SynSin: End-to-end View Synthesis from a Single Image, Available Online at: https://arxiv.org/pdf/1912.08804.pdf, Apr. 18, 2020, 22 pages.

Yu et al., Luminance Attentive Networks for HDR Image and Panorama Reconstruction, Computer Graphics Forum, vol. 40, No. 7, Sep. 14, 2021, pp. 181-192.

Zhan et al., EMLight: Lighting Estimation via Spherical Distribution Approximation, The Thirty-Fifth AAAI Conference on Artificial Intelligence (AAAI-21), Dec. 21, 2020, pp. 3287-3295.

Zhan et al., GMLight: Lighting Estimation via Geometric Distribution Approximation, IEEE Transactions on Image Processing, vol. 31, Feb. 20, 2021, pp. 1-12.

Zhan et al., Sparse Needlets for Lighting Estimation with Spherical Transport Loss, Available Online at: https://arxiv.org/pdf/2106.13090.pdf, Jun. 24, 2021, 11 pages.

Zhang et al., All-Weather Deep Outdoor Lighting Estimation, IEEE/CVF Conference on Computer Vision and Pattern Recognition (CVPR), Jun. 2019, pp. 10158-10166.

Zhang et al., Fixup Initialization: Residual Learning Without Normalization, Available Online at: https://arxiv.org/pdf/1901.09321.pdf, Mar. 12, 2019, pp. 1-16.

Zhang et al., Learning High Dynamic Range from Outdoor Panoramas, IEEE International Conference on Computer Vision (ICCV), Mar. 2017, pp. 4519-4528.

Zhao et al., Large Scale Image Completion via Co-Modulated Generative Adversarial Networks, Available Online at: https://arxiv.org/pdf/2103.10428.pdf, Mar. 18, 2021, pp. 1-25.

Zhao et al., PointAR: Efficient Lighting Estimation for Mobile Augmented Reality, Available Online at: https://arxiv.org/pdf/2004.00006.pdf, Jul. 17, 2020, pp. 1-16.

Zheng et al., Semantic Layout Manipulation with High-Resolution Sparse Attention, Available Online at: https://arxiv.org/pdf/2012.07288.pdf, Dec. 14, 2020, 17 pages.

Zhu et al., IRISformer: Dense Vision Transformers for Single-Image Inverse Rendering in Indoor Scenes, Available Online at: https://arxiv.org/pdf/2206.08423.pdf, Jun. 16, 2022, 19 pages.

Zhu et al., Spatially-Varying Outdoor Lighting Estimation from Intrinsics, Vision and Pattern Recognition (CVPR), Apr. 2021, pp. 12834-12842.

* cited by examiner

400

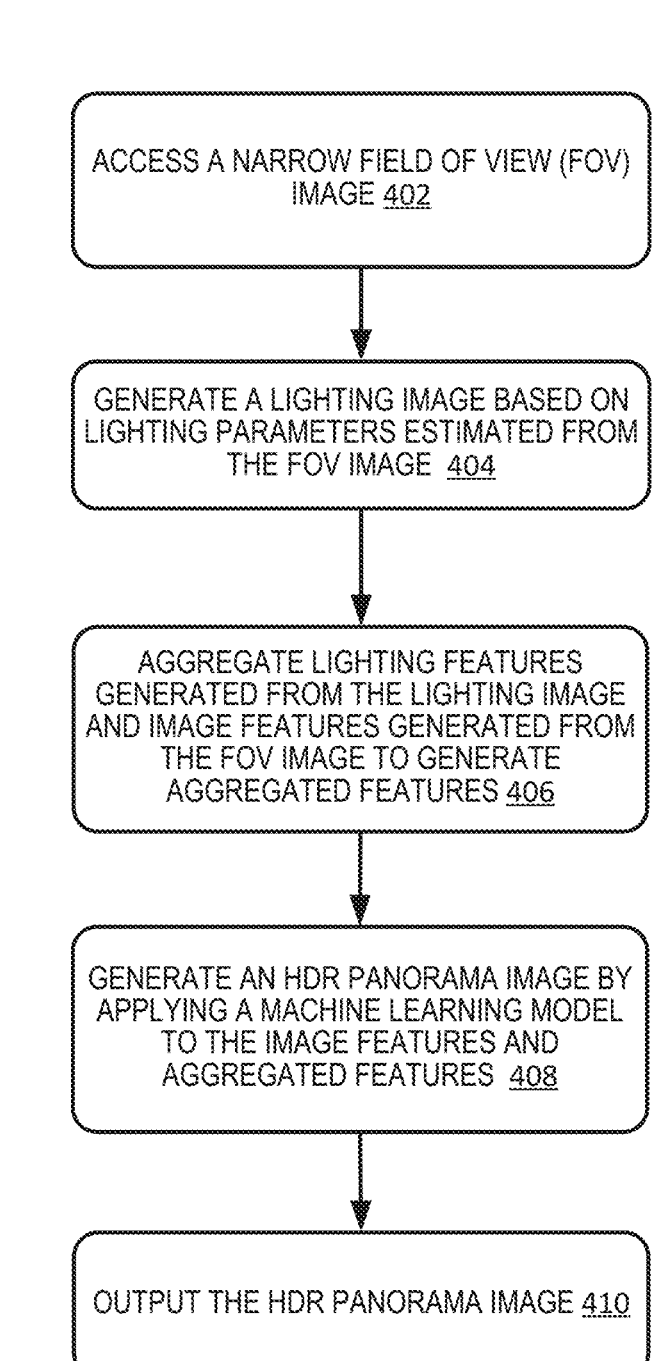

ACCESS A NARROW FIELD OF VIEW (FOV) IMAGE 402

GENERATE A LIGHTING IMAGE BASED ON LIGHTING PARAMETERS ESTIMATED FROM THE FOV IMAGE 404

AGGREGATE LIGHTING FEATURES GENERATED FROM THE LIGHTING IMAGE AND IMAGE FEATURES GENERATED FROM THE FOV IMAGE TO GENERATE AGGREGATED FEATURES 406

GENERATE AN HDR PANORAMA IMAGE BY APPLYING A MACHINE LEARNING MODEL TO THE IMAGE FEATURES AND AGGREGATED FEATURES 408

OUTPUT THE HDR PANORAMA IMAGE 410

FIG. 4

Render w.
input

Render w.
output

FIG. 6

Input        Output (e1)        Output (e2)        Output (e3)

ARTIFICIAL INTELLIGENCE TECHNIQUES FOR EXTRAPOLATING HDR PANORAMAS FROM LDR LOW FOV IMAGES

CROSS-REFERENCE TO RELATED APPLICATIONS

This application claims priority to U.S. Provisional Application No. 63/416,915, entitled "Artificial Intelligence Techniques for Extrapolating HDR Panoramas from LDR Low FOV Images," filed on Oct. 17, 2022, and to U.S. Provisional Application No. 63/456,219, entitled "Artificial Intelligence Techniques for Extrapolating HDR Panoramas from LDR Low FOV Images," filed on Mar. 31, 2023, which are hereby incorporated in their entireties by this reference.

TECHNICAL FIELD

The present disclosure relates generally to artificial intelligence. More specifically, but not by way of limitation, this disclosure relates to employing artificial intelligence techniques for generating 360-degree high dynamic range (HDR) panoramas from low dynamic range (LDR) narrow field of view (FOV) images.

BACKGROUND

Visually pleasing virtual object insertion in a real photo is a complex but critical component of 3D composition and augmented reality. It is especially challenging when inserting shiny or mirror objects that should reveal the whole environment around the camera. However, the input background photograph typically provides 10% or less of the environment information. Therefore, algorithms are necessary to hallucinate an entire lighting environment from a given image.

SUMMARY

Certain embodiments involve employing artificial intelligence techniques for generating 360-degree high dynamic range (HDR) panoramas from low dynamic range (LDR) narrow field of view (FOV) images. In one example, a computing system accesses a field of view (FOV) image that has a field of view less than 360 degrees and has low dynamic range (LDR) values. The computing system estimates lighting parameters from a scene depicted in the FOV image and generates a lighting image based on the lighting parameters. The computing system further generates lighting features generated the lighting image and image features generated from the FOV image. These features are aggregated into aggregated features and a machine learning model is applied to the image features and the aggregated features to generate a panorama image having high dynamic range (HDR) values.

BRIEF DESCRIPTION OF THE DRAWINGS

Features, embodiments, and advantages of the present disclosure are better understood when the following Detailed Description is read with reference to the accompanying drawings.

FIG. 4 shows an example process for generating 360-degree high dynamic range (HDR) panoramas from narrow field of view (FOV) images, according to certain aspects of the present disclosure.

FIG. 6 depicts additional examples of the rendered composed images using the technique disclosed herein.

DETAILED DESCRIPTION

Figure 1:
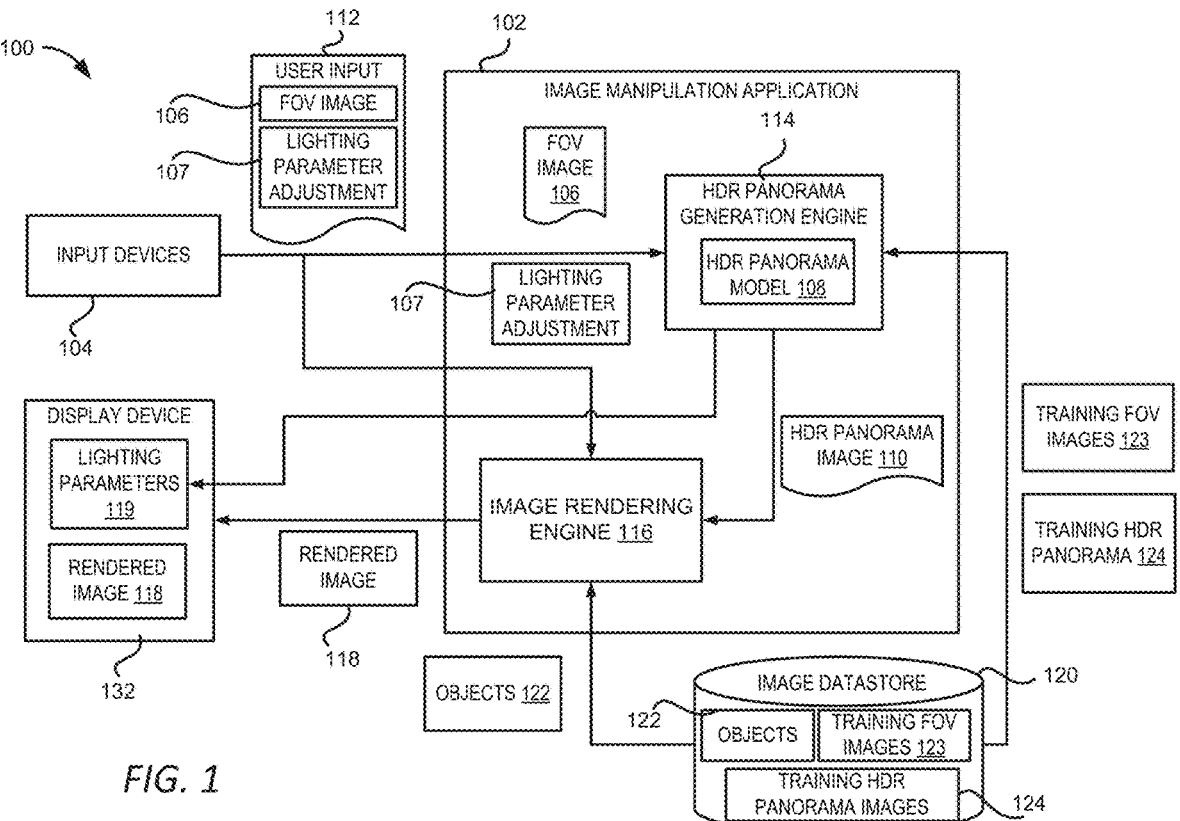
FIG. 1 depicts an example of a computing environment for generating 360-degree high dynamic range (HDR) panoramas from narrow field of view (FOV) images, according to certain embodiments of the present disclosure.

The present disclosure involves employing artificial intelligence techniques for generating 360-degree high dynamic range (HDR) panoramas from low dynamic range (LDR) narrow field of view (FOV) images. As discussed above, in order to insert a visually pleasing virtual object in a real photo, an entire lighting environment from a given image needs to be hallucinated. However, this is an ill-posed problem because much information about the scene is lost during the capturing process. Therefore, an infinite set of environment maps could be predicted for an input image, making the task difficult.

Attempts to address this problem include careful estimation of the light source parameters such as intensity. However, the predicted environment maps are generally blurry and lack enough information to realistically render shiny objects. Generative models are also used to predict the whole environment maps. But these models work in the 8-bits sRGB space, which is very limiting to estimate and cannot accurately represent the whole range of light in a scene. This results in low-contrast renderings with shadows that are very dim. Therefore, a new method is needed to predict environment maps that are detailed and realistic while predicting accurate intensities for light sources. In addition, it is useful to provide some degree of control for the users over the estimated lighting because there is often more than one plausible solution for realistic lighting and users require artistic control over the specific light settings.

Certain aspects and features of the present disclosure can address one or more issues identified above. For example, a data-driven approach for high dynamic range field of view extrapolation can be utilized. This approach generates a high-resolution HDR panorama coherent with an input perspective image. For example, to create photorealistic images, an HDR panorama image simulating a spherical environment surrounding 3D objects can be generated based on an LDR narrow FOV image and the lighting parameters estimated from the FOV image. The rendered image can be generated by simulating a camera capturing an image of the 3D objects placed in the spherical environment depicted by the HDR panorama image.

The following non-limiting example is provided to introduce certain embodiments. In this example, a computing system accesses a field of view (FOV) image that has low dynamic range (LDR) values. The FOV image has a field of view less than 360 degrees. The computing system estimates lighting parameters from a scene depicted in the FOV image. For example, the lighting parameters can be estimated from the input FOV image using machine learning techniques such as neural networks and based on whether the input FOV image contains an indoor scene or an outdoor scene. If the input FOV image is an indoor image, an indoor lighting estimation technique is used to estimate the lighting parameters of the input FOV image; if the input FOV image is an outdoor image, an outdoor lighting estimation technique is used to estimate the lighting parameters of the input FOV image. Examples of the estimated lighting parameters can include the position(s) of the light source(s), the elevation(s) of the light source(s), the radius(es) of the light source(s), the intensities of the light source(s), and so on. Based on the lighting parameters, the computing system generates a lighting image, which may be a spherical Gaussian image.

To allow a user to control the generated HDR panorama image, the estimated lighting parameters are displayed in a user interface to allow the user to adjust the lighting parameters to generate the HDR panorama image in different lighting environments. The lighting parameters can be modified by a user and the lighting image is updated based on the modified lighting parameters. In another example, the lighting parameters are specified based on a user input and the lighting image is generated based on the user-specified lighting parameters. The computing system further generates lighting features from the lighting image, such as by using a lighting encoder. In some examples, the lighting encoder can be a series of convolutional neural networks configured to accept the lighting image as input and output the lighting features. In some implementations, the lighting image is processed before being provided to the lighting encoder, such as through tone mapping to conform the dynamic range of the lighting image to the dynamic range of a regular image.

In addition to the lighting features, the computing system can further generate image features from the FOV image, such as using an image encoder. These generated features are aggregated into aggregated features, such as through an affine transformation. In some examples, a machine learning model is applied to the image features and the aggregated features to generate a panorama image having high dynamic range (HDR) values. For instance, an HDR-synthesis model, which can be a generative adversarial network (GAN) model including a generator and one or more discriminators, can accept the image features as input and use the aggregated features as side channel information to generate the HDR panorama image. In other examples, a standard synthesis model (e.g., an LDR-synthesis model) is used and the lighting image is added to the output of the machine learning model to generate the HDR panorama image.

The generated HDR panorama image can be used to generate photorealistic composed images by inserting 3D objects in the HDR panorama image. Other user inputs, such as the capturing angle, the field of view of the simulated camera, the brightness, color, contrast of the image and so on, can be accepted during the rendering process. The rendered image is then sent to a display device for display.

As described herein, certain embodiments provide improvements to image processing and artificial intelligence by generating 360-degree high dynamic range (HDR) panoramas from low dynamic range (LDR) narrow field of view (FOV) images. In this way, the environment maps predicted by the machine learning model are detailed and realistic with accurately predicted intensities for light sources. 3D objects can be inserted into the HDR panorama image and photorealistic composed images can be rendered. Compared with existing approaches, the rendered images based on the present techniques look more realistic especially in terms of the lighting, color, and shadows. Further, the technique described herein further allows the users to control over the estimated lighting to achieve various light settings.

Referring now to the drawings, FIG. 1 depicts an example of a computing environment 100 for using an image manipulation application 102 to perform image manipulation based on a user input 112. The computing environment 100 includes one or more processing devices that execute an image manipulation application 102, an input device 104 for providing commands to the image manipulation application 102, and a display device 132 for displaying a user interface for receiving commands from the input device 104 (such as lighting parameter adjustments) and for displaying a rendered image 118 generated by the image manipulation application 102 based on the commands.

The image manipulation application 102 includes an image rendering engine 116 for generating rendered images based on the user input 112 and for providing the rendered image 118 to the display device 132 for display. The image manipulation application 102 further includes an HDR panorama generation engine 114 for generating a HDR panorama image 110 based on an input low dynamic range (LDR) narrow FOV image 106 (also referred to herein as "FOV image 106") which may also be referred to herein as a "background image 106." The FOV image has a field of view less than 360 degrees. The HDR panorama generation engine 114 trains and applies an HDR panorama model 108 to generate an HDR panorama image from the FOV image 106. Training of the HDR panorama model 108 is performed based on a set of training FOV images 123 and corresponding training HDR panorama images 124. The training HDR panorama images 124 can include 360-degree spherical environment images or any image showing a wide-angle view or representation of a physical space depicted by the respective training FOV images 123. Detailed examples of generating the training HDR panorama images 124 and training the HDR panorama model 108 are described herein with respect to FIGS. 2-5.

The HDR panorama image 110 created by the HDR panorama generation engine 114 is utilized by the image rendering engine 116 to perform various image manipulations based on the user input 112 and to generate the rendered image 118. For example, the image manipulation application 102 provides functions that allow a user to combine a 2D FOV image 106 with 3D objects 122 to generate a composed image showing the 3D objects 122 positioned in an environment illustrated in the FOV image. The FOV image 106 can be provided by a user in the user input 112, such as via a user selecting the FOV image 106 from a local storage device or a network storage device. Alternatively, or additionally, the image manipulation application 102 allows the user to select the FOV image 106 from an image datastore 120 accessible to the image manipulation application 102. Similarly, the user of the image manipulation application 102 can provide the 3D objects 122 to the image manipulation application 102 or select the 3D objects 122 from the image datastore 120 or other object datastore provided by the image manipulation application 102.

To create photorealistic images, the image manipulation application 102 utilizes the HDR panorama generation engine 114 to generate an HDR panorama image 110 simulating a spherical environment surrounding the 3D objects 122 based on the LDR narrow FOV image 106. The image rendering engine 116 generates the rendered image 118 by simulating a camera capturing an image of the 3D objects 122 placed in the spherical environment depicted by the HDR panorama image 110. The image rendering engine 116 can also accept user input 112 during the rendering process, for example, to adjust parameters such as the capturing angle, the field of view of the simulated camera, the brightness, color, contrast of the image and so on. The rendered image 118 is then sent to the display device 132 for display.

As will be discussed below in detail, the HDR panorama model 108 also estimates the lighting parameters of the input FOV image 106. The estimated lighting parameters 119 are displayed in a user interface to allow the user to adjust the lighting parameters to generate the HDR panorama image 110 in different lighting environments. The lighting parameter adjustment 107 is then input back to the HDR panorama model 108 for use in the generation of the HDR panorama image 110. In another example, the lighting parameters are specified through a user input and the HDR panorama image 110 is generated based on the user-specified lighting parameters.

While in FIG. 1, the HDR panorama generation engine 114 is described as being used to train the HDR panorama model 108, the training can be performed in another component of the image manipulation application 102 or by another computing system other than the computing system in environment 100. After the training, the trained HDR panorama model 108 is loaded into the HDR panorama generation engine 114 for use in the generation of the HDR panorama image 110. Likewise, the training FOV images 123 and training HDR panorama images 124 can be stored in another storage device other than the image datastore 120 that is accessible by the component or system configured to train the HDR panorama model 108.

The HDR lighting estimation can be framed as outpainting in a latitude-longitude (or equirectangular) panoramic representation. The input image I can be wrapped to a 360° panorama $X \in R^{H \times W \times 3}$, where H and W are the panorama height and width respectively, according to a pinhole camera model (with common assumptions: the principal point is the image center, negligible skew, unit pixel aspect ratio). The camera parameters such as field of view and camera elevation and roll are known. In some examples, W=2H; in other examples, W=H. W and H may have other relationships as well.

Figure 2:
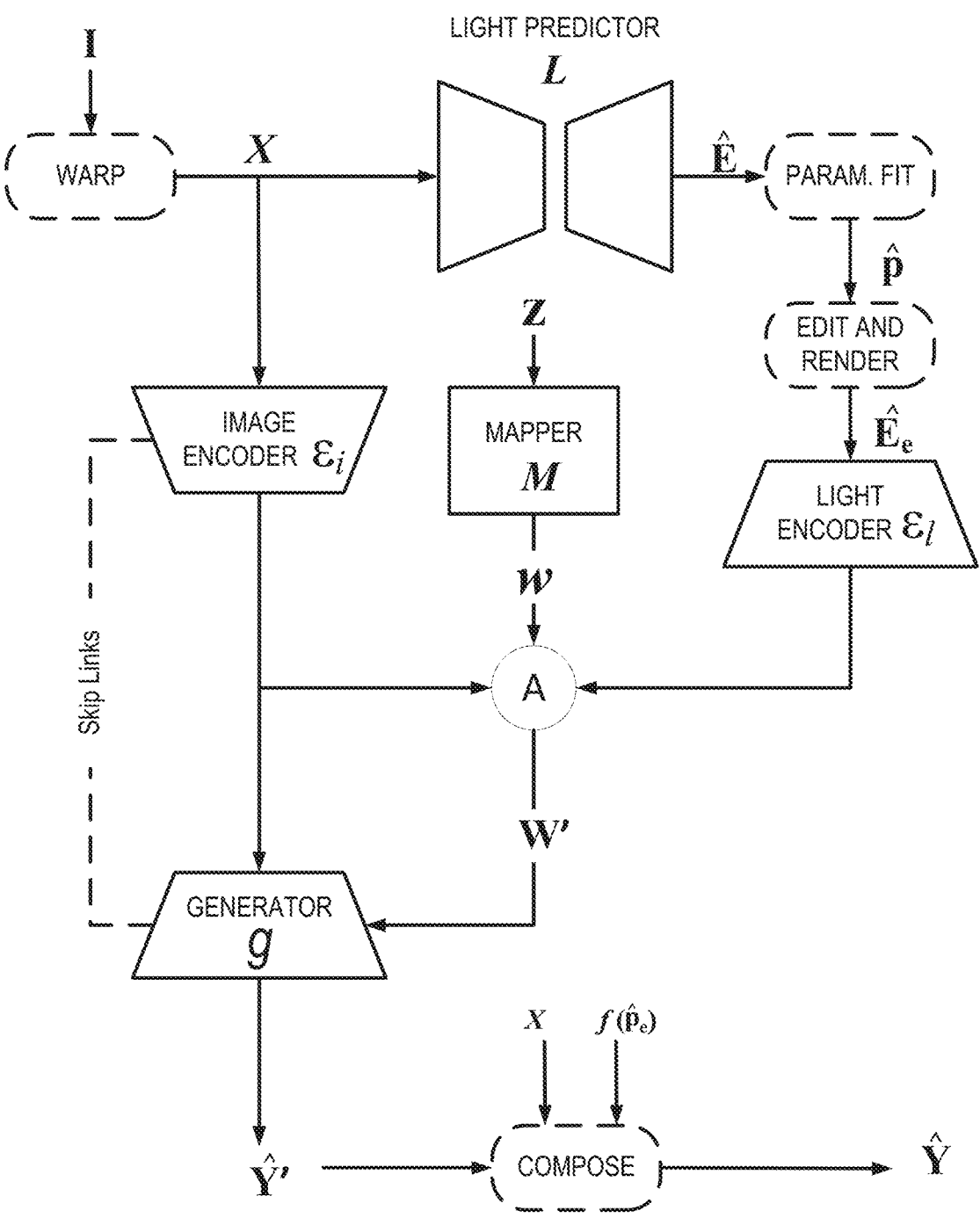
FIG. 2 shows an example of a block diagram of the high dynamic range (HDR) panorama model for generating 360-degree HDR panoramas from narrow field of view (FOV) images using editable lighting co-modulation method, according to certain aspects of the present disclosure.

FIG. 2 shows an example of a block diagram of the HDR panorama model 108 for generating 360-degree high dynamic range (HDR) panoramas from narrow field of view (FOV) images using editable lighting co-modulation method, according to one example of the present disclosure. The editable light co-modulation method first estimates an HDR light map $\hat{E}$ from the warped image X through a light predictor L. The light map is converted to a parametric model $\bar{p}$ and can optionally be edited by a user to obtain $\hat{p}_e$ before being re-rendered to an image $\hat{E}_e$ and injected in the style co-modulation mechanism via a light encoder $\varepsilon_l$.

A light prediction network L produces an HDR light environment map $\hat{E} \in R^{H \times W \times 3}$ from the input partially-observed panorama X. In some examples, the light map (which is a light estimation panorama) is then converted to a parametric lighting form $\hat{p}=f-1(\hat{E})$, which can, optionally, be edited by a user to obtain $\hat{p}_e$. It is then rendered back to a panorama $\hat{E}_e=f(\hat{p}_e) \in R^{H \times W \times 3}$ before being fed to a light encoder $E_l$. Alternatively, or additionally, the light map is fed into the light encoder $E_l$ directly without converting to the parametric lighting form and rendering back to the panorama. The output of the light encoder $E_l$ is concatenated to the other vectors produced by the image encoder $\varepsilon_i$ and mapper M before being given to the affine transform A. This modulates the style injection mechanism of the generator with information from the input image, the random style, and the lighting information, hence the entire style co-modulation process becomes $$w'=A(\varepsilon_i(X),M(z),\varepsilon_l(\hat{E}_e)). \tag{1}$$

where z~N (0, I) is a random noise vector, and w is the style vector modulating the generator G. The output of $\varepsilon_i(X)$ is also provided as the input tensor to G. The (edited) light map $\hat{E}_e$ is also composited with $\hat{Y}'$ to produce the final result $\hat{Y}$.

The dominant light sources in a scene can be modeled as isotropic spherical gaussians. Given a set of K spherical gaussians, light intensity L(ω) along (unit) direction vector $\omega \in S_2$ is given by $$L(\omega) = f_{SG}(\omega; \{c_k, \xi_k, \sigma_k\}_{k=1}^K) = \sum_{k=1}^K c_k G(\omega; \xi_k, \sigma_k) \tag{2}$$

where $$G(\omega; \xi, 0) = \exp\left(-\frac{1}{\sigma^2}(1 - \omega \cdot \xi)\right).$$

Here, K denotes the number of individual light sources, $c_k$ the RGB intensity of each light source. $\xi_k \in S^2$ and $\sigma_k \in R^1$ control the direction and bandwidth of each light source, respectively. Each light source is represented by 3 parameters $p=\{c_k, \xi_k, \sigma_k\}$. This compact, parametric form of spherical gaussians makes them suitable for editing: users can understand and modify their parameters. After editing, the spherical gaussians are rendered to an image format $f \equiv f_{SG}(\hat{E}_e)$ using eq. (2) before being given to the light encoder $\varepsilon_l$. A light predictor network L is trained to predict the light sources in an image format.

To obtain the parameters p from both the predicted light map $\bar{E}$ and real panoramas E, the following procedure is employed. The HDR values on which their connected components are computed are thresholded. The gaussians position $\xi_k$ and intensity are initialized at the center of mass and the maximum intensity of each connected component, respectively. Gaussian bandwidths are initialized with a fixed σ. For example, σ can take the value of 0.45. Other values of σ may be used. We obtain the light parameters p by optimizing the L2 reconstruction error over every pixel of the panorama Ω as $$\hat{p} = \text{argmin}_p \sum_{\omega \in \Omega} \lambda_1 \|f_{SG}(\omega; p) - E(\omega)\|_2^2 + l_{reg}(p) \tag{3}$$

where $\lambda_1$ acts as a loss scaling factor and $l_{reg}(p)$ is a regularizing term stabilizing the optimization over light vector length, intensity, bandwidth, and color. Non-maximal suppression is used to fuse overlapping lights during the optimization.

Figure 3:
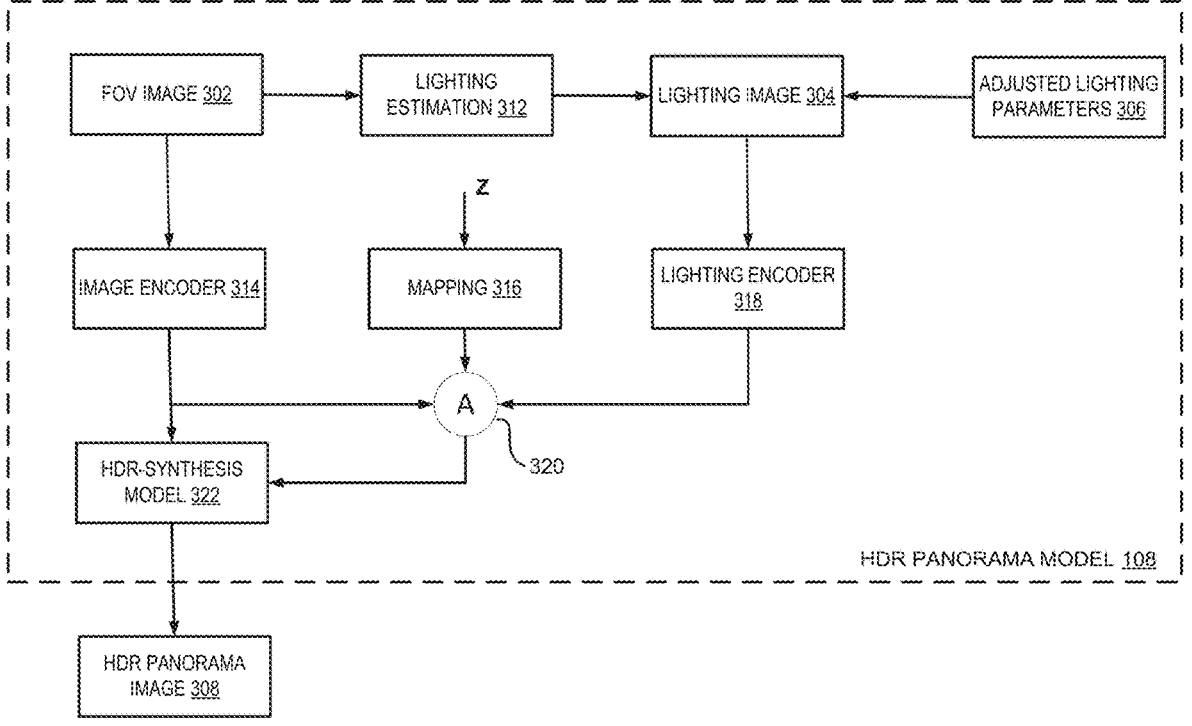
FIG. 3 an example of a block diagram of the high dynamic range (HDR) panorama model for generating 360-degree HDR panoramas from narrow field of view (FOV) images, according to certain aspects of the present disclosure.

FIG. 3 shows another example of a block diagram of the HDR panorama model 108 for generating 360-degree high dynamic range (HDR) panoramas from narrow field of view (FOV) images, according to one example of the present disclosure. In this example, the HDR panorama model 108 accepts an FOV image 302 as input and outputs an HDR panorama image 308. The FOV image 302 has a limited field of view and has low dynamic range (LDR) values. The HDR panorama image 308 has a 360-degree field of view and has HDR values. The HDR panorama model 108 includes a lighting estimation module 312 configured for estimating the lighting parameters of the input FOV image 302.

The lighting estimation module 312 estimates the lighting parameters from the input FOV image 302 using machine learning techniques such as neural networks. To do so, the lighting estimation module 312 analyzes the content of the input FOV image 302 and determines whether the input FOV image 302 contains an indoor scene or an outdoor scene. If the input FOV image 302 is an indoor image, the lighting estimation module 312 uses an indoor lighting estimation technique to estimate the lighting parameters of the input FOV image 302. For example, a source-specific-lighting-estimation-neural network can be used to generate three-dimensional ("3D") lighting parameters specific to a light source illuminating the input FOV image. To generate such source-specific-lighting parameters, for instance, a compact source-specific-lighting-estimation-neural network can be used which include both common network layers and network layers specific to different lighting parameters. Such a source-specific-lighting-estimation-neural network can be trained to accurately estimate spatially varying lighting in a digital image based on comparisons of predicted environment maps from a differentiable-projection layer with ground-truth-environment maps.

If the input FOV image 302 is an outdoor image, the lighting estimation module 312 uses an outdoor lighting estimation technique to estimate the lighting parameters of the input FOV image 302. For example, the FOV image can be analyzed to estimate a set of high-dynamic range lighting conditions associated with the FOV image. Additionally, a convolutional neural network can be trained to extrapolate lighting conditions from a digital image. The low-dynamic range information can be augmented from the FOV image by using a sky model algorithm to predict high-dynamic range lighting conditions. Examples of the estimated lighting parameters can include the position(s) of the light source(s), the elevation(s) of the light source(s), the radius(es) of the light source(s), the intensities of the light source(s), and so on.

With the estimated lighting parameters, a lighting image 304 such as a spherical gaussian image is generated. In some examples, the lighting image 304 is a spherical image captured from a simulated scene lighted with the estimated light source(s) configured with the estimated lighting parameters. Alternative or in addition to the spherical gaussians, other lighting representation can also be generated as the lighting image, such as spherical harmonics. In addition, the estimated lighting parameters can be presented in a user interface for display to a user. The user interface also allows the user to adjust the parameters individually to achieve a desired lighting effect. The lighting image 304 is also updated as the user adjusts the lighting parameters 306 through the user interface. In another example, the lighting parameters are specified based on a user input rather than being estimated from the FOV image and the lighting image 304 is generated based on the user-specified lighting parameters.

The HDR panorama model 108 further includes an image encoder 314 configured for generating features or embeddings or other implicit representations of the input FOV image 302. In some examples, the image encoder 314 is series of convolutional neural networks. The image encoder 314 outputs a feature vector representing the input FOV image 302. The HDR panorama model 108 also includes a mapping module 316 configured to take a random noise signal Z as input (e.g., Gaussian random noise with zero mean and unit variance) and map Z to a larger and more complex space in which data points are represented with vectors having the same dimension as the feature vector of the input FOV image 302. By using the mapping module 316, the entropy of the model can be increased to add more high-frequency details which helps with increasing the visual quality of the details in the output HDR panorama image 308.

To allow for user control of the generated HDR panorama image 308, the HDR panorama model 108 further utilizes a lighting encoder 318 to generate a feature vector from the lighting image 304. In some examples, the lighting encoder 318 can be configured to have a similar structure as the image encoder 314 but using the lighting image 304 as input. In order for the lighting encoder 318 to accept the lighting image 304 as input, the lighting image 304 is processed before being provided to the lighting encoder 318. For example, the lighting image 304 can be processed, such as through tone mapping, to conform the dynamic range of the lighting image 304 to the dynamic range of a regular image. For example, the tone mapping can use the gamma correction to fix the dynamic range of the lighting image 304. The gamma value of the gamma correction can be set to, for example, 1/2.2, or another value that is lower than 1 and higher than 0.

The generated three types of feature vectors are then combined using an aggregator 320. In some examples, the aggregator 320 uses an affine transformation to combine the features vectors from the image encoder 314, the mapping module 316, and the lighting encoder 318 into a single feature vector to be used by the HDR-synthesis model 322. The parameters of the affine transformation can be adjusted during the training of the HDR panorama model 108. Note that feature vectors are used merely as an example of the output of the image encoder 314, the mapping module 316, and the lighting encoder 318, and should not be construed as limiting. Other data structures can be used to represent the features or embeddings generated by these modules, such as data arrays or matrices.

The data generated by the modules or models in the HDR panorama model 108 discussed above are then provided to the HDR-synthesis model 322 to generate the final output of the HDR panorama image 308. In some examples, the HDR-Synthesis model is a generative adversarial network (GAN) model that includes a generator and one or more discriminators. The output of the image encoder 314 is used as the input to the HDR-synthesis model 322 and the combined features generated by the aggregator 320 are used as side channel information to facilitate the process of generating the HDR panorama image 308. In some examples, the HDR-synthesis model 322 is a GAN synthesis network such as StyleGAN 2. There are two discriminators: one is used to ensure the texture in the HDR panorama image 308 is realistic and the other one is to ensure the lighting information (such as intensity and color) is realistic.

Both of these discriminators have the same architecture, and both discriminators are trained using an adversarial loss. The main difference between these two discriminators are their inputs. The output of the generator is split on their dynamic range using two different thresholds, one for texture and the other for HDR values.

Figure 3A:
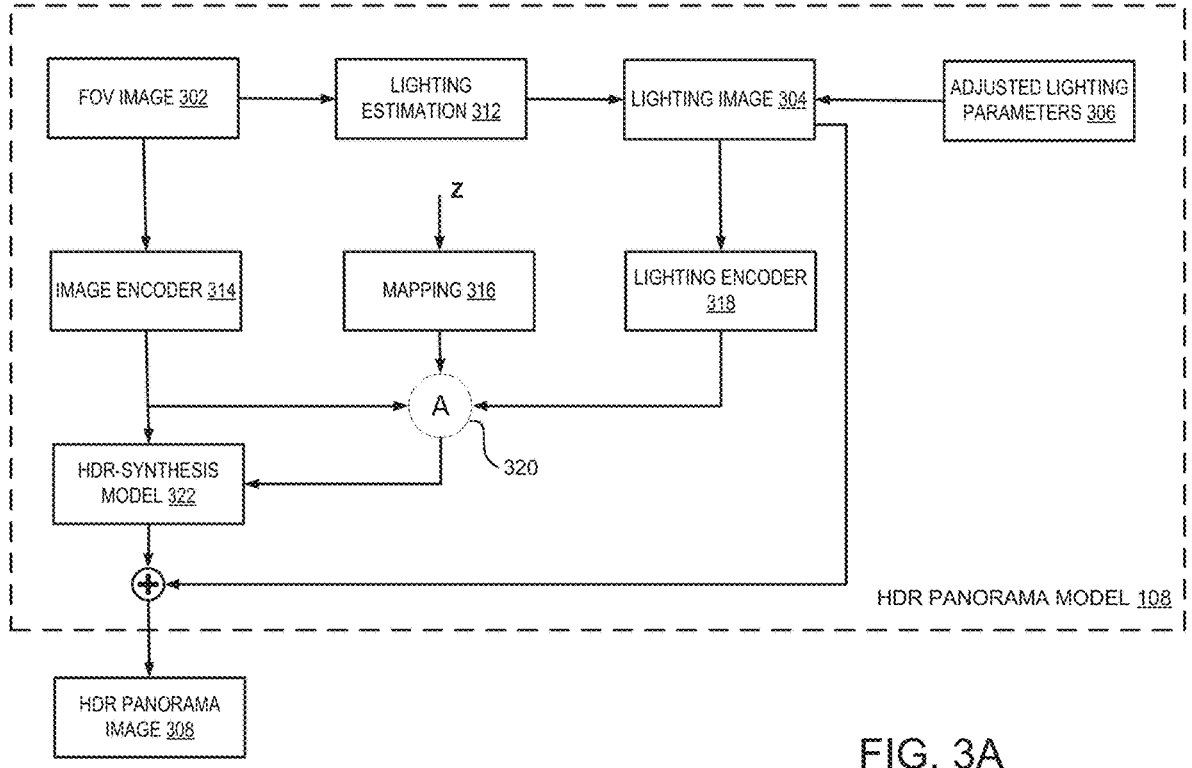
FIG. 3A shows another example of a block diagram of the high dynamic range (HDR) panorama model for generating 360-degree HDR panoramas from narrow field of view (FOV) images, according to certain aspects of the present disclosure.

FIG. 3A shows another example of a block diagram of the HDR panorama model 108 for generating 360-degree high dynamic range (HDR) panoramas from narrow field of view (FOV) images, according to one example of the present disclosure. In this example, in addition to the blocks described above with respect to FIG. 3, the lighting image 304 is added to the output of the HDR-synthesis model 322. In this way, the HDR-synthesis model 322 can be a standard synthesis model (e.g., LDR-Synthesis) which makes the method more stable during training, while preserving the editability discussed above.

FIG. 4 shows an example process 400 for generating 360-degree high dynamic range (HDR) panoramas from narrow field of view (FOV) images, according to one example of the present disclosure. One or more computing devices (e.g., the computing devices in the computing environment 100 in FIG. 1) implement operations depicted in FIG. 4 by executing suitable program code (e.g., the image manipulation application 102 in FIG. 1). For illustrative purposes, the process 400 is described with reference to certain examples depicted in the figures. Other implementations, however, are possible.

At block 402, the process 400 involves accessing a narrow field of view (FOV) image. The FOV image can be the LDR narrow FOV image 106 described above with respect to FIG. 1 and the narrow FOV image 302 described above with respect to FIGS. 3 and 3A. The FOV image can depict any scene that can serve as a background image for inserting a 3D object to generate photorealistic rendered images.

At block 404, the process 400 involves generating a lighting image based on lighting parameters estimated from the narrow FOV image. In some examples, the lighting image is the lighting image discussed above with respect to FIG. 1 which can be a spherical image captured from a simulated scene lighted with the estimated light source(s) configured with the estimated lighting parameters. In alternative or additional examples, other lighting representation can also be generated as the lighting image, such as spherical harmonics. In further examples, the estimated lighting parameters can be presented in a user interface for display to a user. The user interface also allows the user to adjust the parameters individually to achieve a desired lighting effect. In those examples, the lighting image is also updated as the user adjusts the lighting parameters through the user interface.

At block 406, the process 400 involves aggregating lighting features generated from the lighting image and image features generated from the narrow FOV image to generate aggregated features. As discussed above with respect to FIGS. 1-3A, an image encoder 314 can be employed to generate features or embeddings or other implicit representations of the input FOV image, collectively referred to as "image features." A feature vector from the lighting image can be generated by utilizing, for example, a lighting encoder 318 to allow for user control of the generated HDR panorama image. The lighting image may be processed before being provided to the lighting encoder such as through tone mapping, to conform the dynamic range of the lighting image to the dynamic range of a regular image. The generated feature vectors are then combined to generate aggregated features, for example, using an aggregator 320. In some examples, the combination is through an affine transformation of the image features and the lighting features into a single feature vector. The parameters of the affine transformation can be adjusted during the training of the machine learning model used to generate the HDR panorama image (e.g., the HDR panorama model 108). In some examples, the aggregation further includes a vector generated by a mapping module 316 by mapping a random noise signal Z (e.g., Gaussian random noise with zero mean and unit variance) to a larger and more complex space in which data points are represented with vectors having the same dimension as the feature vector of the input FOV image. In these examples, the affine transformation can be applied to all three types of features to generate the aggregated features. Functions included in block 406 can be used to implement a step for generating aggregated features based on the lighting image.

At block 408, the process 400 involves applying a machine learning model to the image features and aggregated features to generate an HDR panorama image. The machine learning model can be the HDR-synthesis model 322 discussed above with respect to FIGS. 3 and 3A. In some examples, the machine learning model is a generative adversarial network (GAN) model that includes a generator and one or more discriminators. The image features can be provided as the input to the machine learning model and the aggregated features can be used as side channel information to facilitate the process of generating the HDR panorama image. In some examples, the lighting image can be combined with the output of the machine learning model to obtain the final HDR panorama image. At block 410, the process 400 involves outputting the HDR panorama image. Functions included in block 408 can be used to implement a step for generating a panorama image having high dynamic range (HDR) values based on image features generated from the FOV image and the aggregated features.

Figure 5:
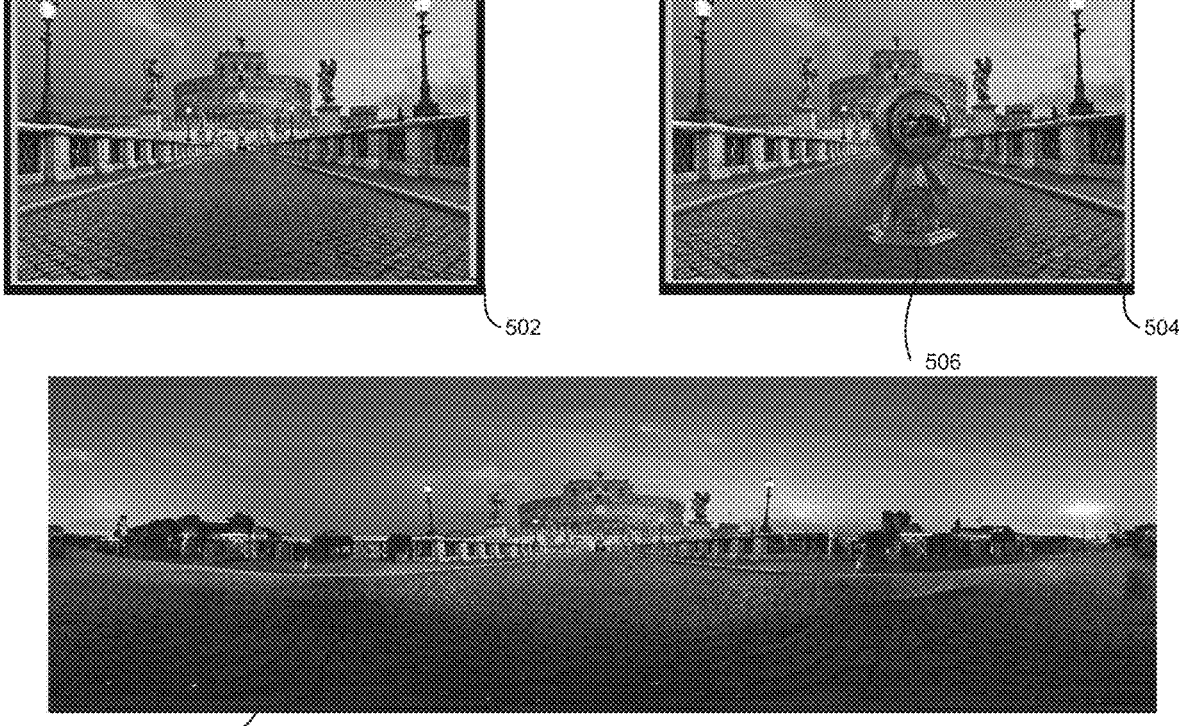
FIG. 5 depicts an example of an input low dynamic range (LDR) narrow FOV image and the generated HDR panorama image as well as a composed image generated by inserting an object into the FOV image, according to certain aspects of the present disclosure.

As discussed above with respect to FIG. 1, in some applications, the HDR panorama image is utilized to generate photorealistic composed images by inserting 3D objects in the HDR panorama image 308. For example, the system can simulate a camera capturing an image of 3D objects placed in the spherical environment depicted by the HDR panorama image 308. FIG. 5 shows an example of the input LDR narrow FOV image 502 and the generated HDR panorama image 508 as well as a composed image 504 generated by inserting an object 506 into the FOV image 502. In the example shown in FIG. 5, a shiny metal robot object is composited into the FOV image 502 depicting an outdoor scene with night lights. The image shows plausible reflection of lights on the surface of the robot model because of the high dynamic range of the HDR panorama image 308 and the accurate estimation of lighting sources and lighting parameters generated using the mechanism described herein.

Figure 6:
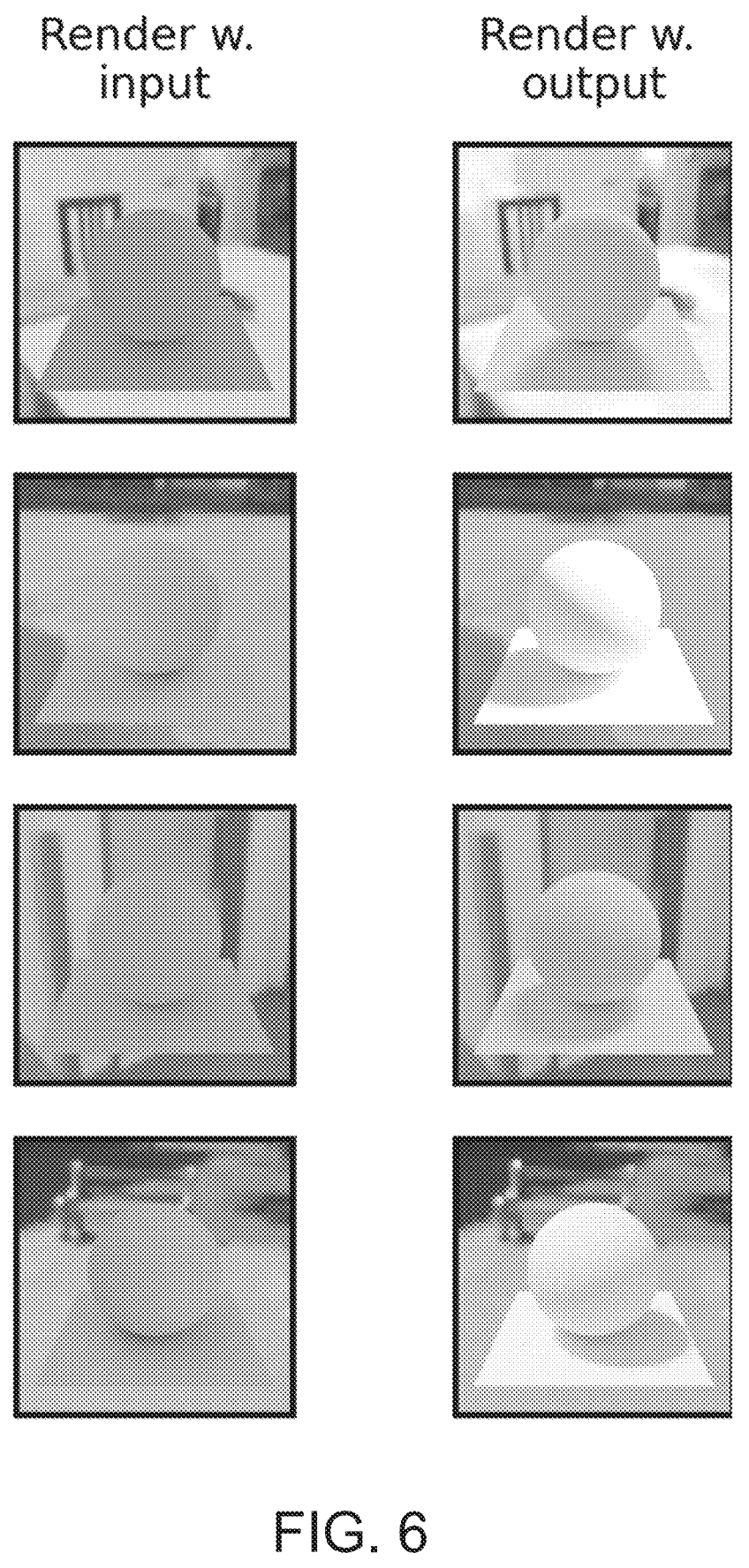

FIG. 6 shows more examples of the rendered composed images using the technique disclosed herein. In FIG. 6, a ball and a flat surface are inserted into each of the four background images shown in the respective rows. The left column of FIG. 6 shows the rendered images generated an LDR image and the right column shows the rendered images using the corresponding HDR version of the image. As can be seen from FIG. 6, the rendered images in the right column look more realistic especially in terms of the lighting, color, and shadows. As such, extrapolating the HDR information for an LDR image used for rendering can increase the visual quality of the rendered images.

As discussed above, the training LDR narrow FOV images 123 and corresponding training HDR panorama images 124 are used to train the HDR panorama model 108. However, acquiring a HDR dataset is very time-consuming and computationally intensive, and existing available datasets contain very limited number of images (at most 2K panoramas). To address this issue, an approach to increase the number of high dynamic range panoramas is proposed. In this approach, learning-based inverse tone mapping methods (also called LDR2HDR methods) are used to uplift an existing low dynamic range datasets to high dynamic range. For instance, a luminance attentive network (LANet) can be used as an LDR2HDR method to construct an HDR image from a single LDR image. The LANet is a multitask network with two streams, named luminance attention stream and HDR reconstruction stream. The luminance attention stream is designed for network to learn to obtain a spatial weighted attention map about the luminance distribution. This design exploits estimated luminance segmentation as an auxiliary task to supervise the attention weights, and a luminance attention module is used to guide the reconstruction process paying more attention to those under-/over-exposed areas where the main error between LDR images and HDR images occurs.

Figure 7:
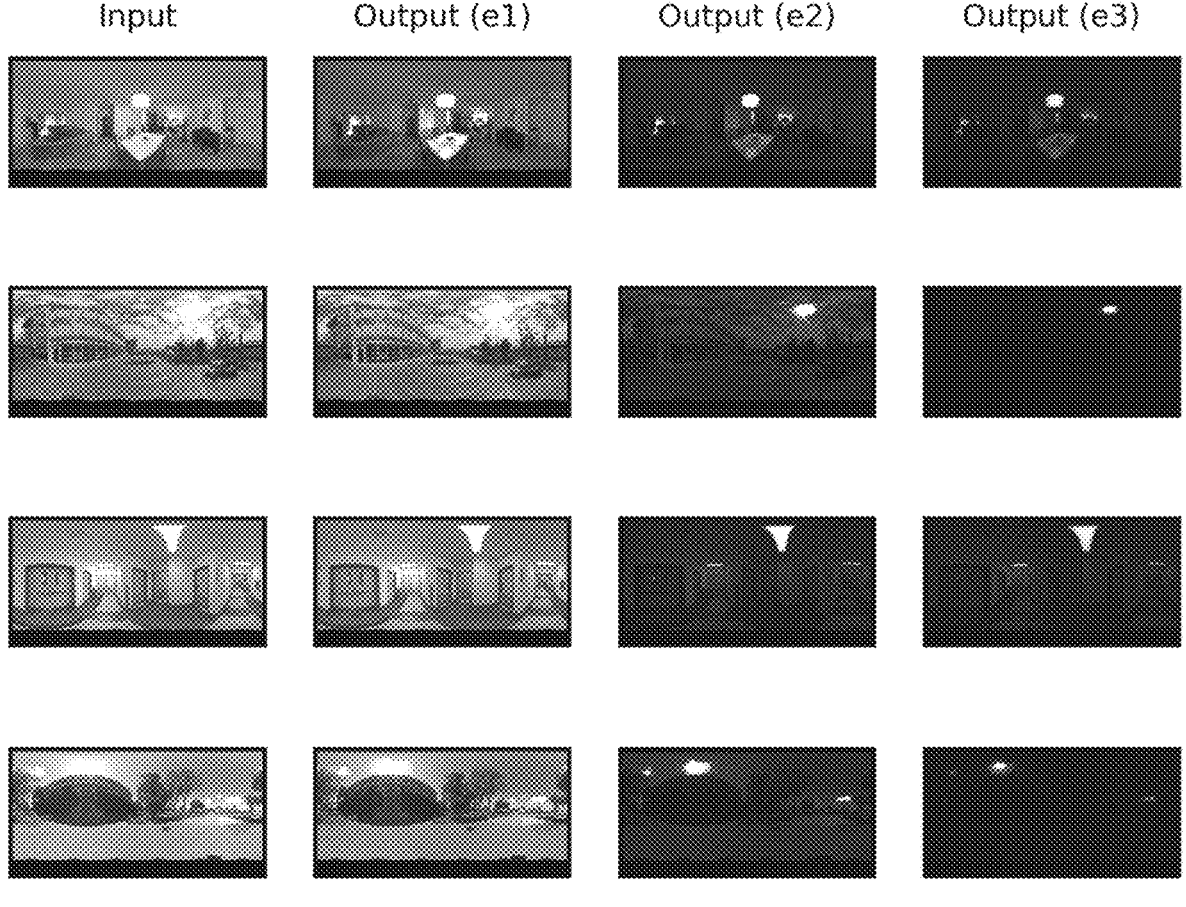
FIG. 7 depicts examples of results of applying a learning-based inverse tone mapping network on a dataset, according to certain aspects of the present disclosure.

The LDR2HDR network is applied on a dataset of low dynamic range panoramas. Although the panoramas in the dataset have low dynamic range (e.g., 8 bits unsigned integers or any saturated data), the dataset is selected to include panoramas ranging from different locations all around the world (e.g., 250K panoramas). FIG. 7 shows examples of the results of the LDR2HDR network on the dataset. The first column is the input to the LDR2HDR network. The columns two to four are the output of LDR2HDR network in different exposures.

The training FOV images 123 can be generated by cropping the panorama images that are input to the LDR2HDR network to limit the field of view of the images. In some examples, the cropping is performed by converting the latitude-longitude to 3D world coordinates and then project them into a plane using pinhole camera model. The generated FOV images and the panorama images output by the LDR2HDR network can be used to train the HDR panorama model 108. The training involves adjusting the parameters of the HDR panorama model 108, including the parameters of the image encoder 214, the mapping module 216, the lighting encoder 218, and the aggregator 220, to minimize an overall loss function.

Figure 8:
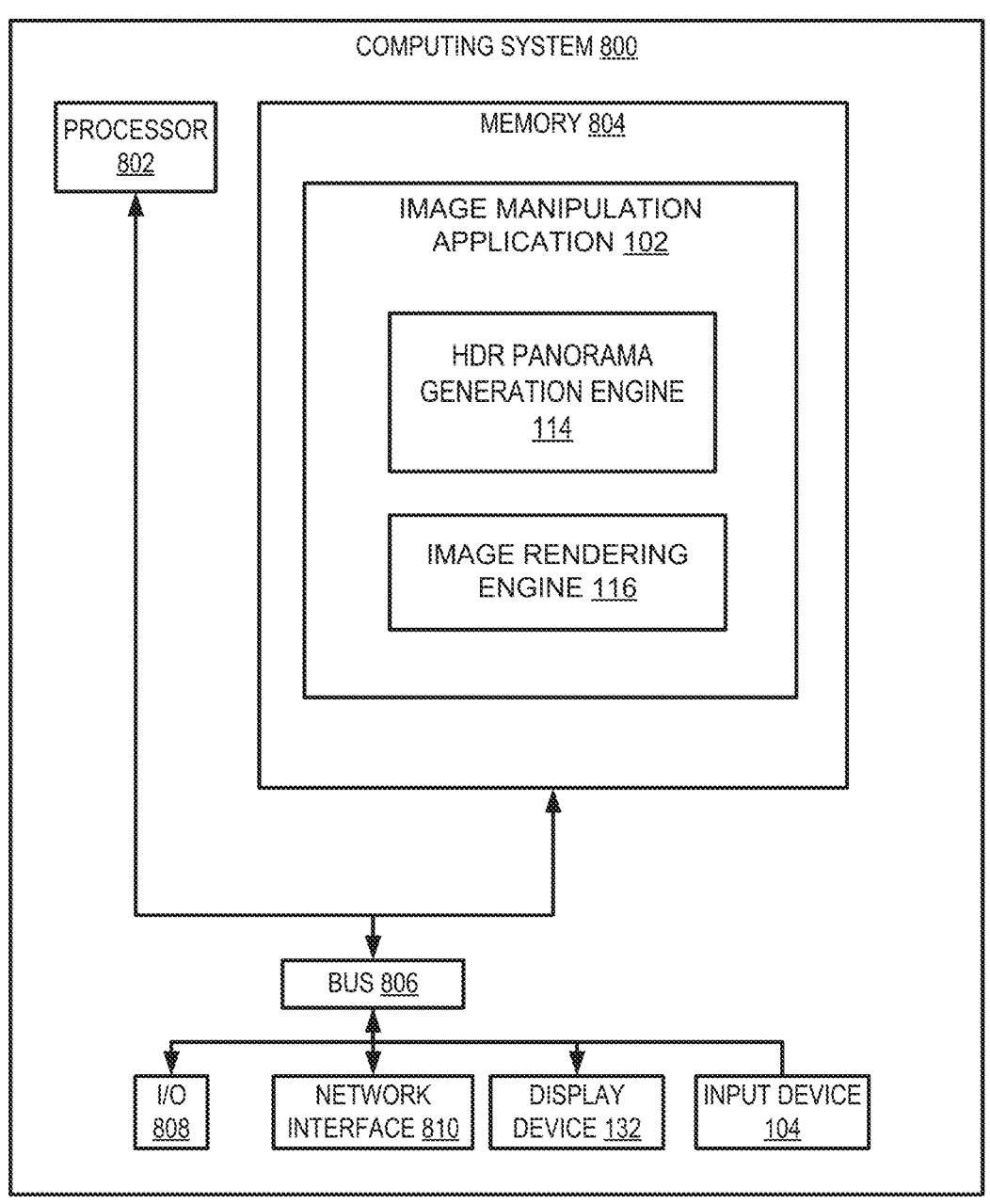
FIG. 8 depicts an example of a computing system that executes an image manipulation application for performing certain aspects of the present disclosure.

Computing System Example for Implementing HDR Panorama Extrapolation from FOV Images Any suitable computing system or group of computing systems can be used for performing the operations described herein. For example, FIG. 8 depicts an example of a computing system 800 that can implement the computing environment of FIG. 1. In some embodiments, the computing system 800 includes a processing device 802 that executes the image manipulation application 102, a memory that stores various data computed or used by the image manipulation application 102, an input device 104 (e.g., a mouse, a stylus, a touchpad, a touchscreen, etc.), and a display device 132 that displays graphical content generated by the image manipulation application 102. For illustrative purposes, FIG. 8 depicts a single computing system on which the image manipulation application 102 is executed, FOV images and objects are stored, and the input device 104 and display device 132 are present. But these applications, datasets, and devices can be stored or included across different computing systems having devices similar to the devices depicted in FIG. 8.

The depicted example of a computing system 800 includes a processing device 802 communicatively coupled to one or more memory devices 804. The processing device 802 executes computer-executable program code stored in a memory device 804, accesses information stored in the memory device 804, or both. Examples of the processing device 802 include a microprocessor, an application-specific integrated circuit ("ASIC"), a field-programmable gate array ("FPGA"), or any other suitable processing device. The processing device 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 800 may also include a number of external or internal devices, such as an input device 104, a display device 132, or other input or output devices. For example, the computing system 800 is shown with one or more input/output ("I/O") interfaces 808. An I/O interface 808 can receive input from input devices or provide output to output devices. One or more buses 806 are also included in the computing system 800. The buses 806 communicatively couples one or more components of a respective one of the computing system 800.

The computing system 800 executes program code that configures the processing device 802 to perform one or more of the operations described herein. The program code includes, for example, the image manipulation application 102 or other suitable applications that perform one or more operations described herein. The program code may be resident in the memory device 804 or any suitable computer-readable medium and may be executed by the processing device 802 or any other suitable processor. In some embodiments, all modules in the image manipulation application 102 (e.g., the HDR panorama generation engine 114, the image rendering engine 116, etc.) are stored in the memory device 804, as depicted in FIG. 8. In additional or alternative embodiments, one or more of these modules from the image manipulation application 102 are stored in different memory devices of different computing systems.

In some embodiments, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices (e.g., a computing device that receives inputs for image manipulation application 102 or displays outputs of the image manipulation application 102) via a data network using the network interface device 810.

An input device 104 can include any device or group of devices suitable for receiving visual, auditory, or other suitable input that controls or affects the operations of the processing device 802. Non-limiting examples of the input device 104 include a touchscreen, stylus, a mouse, a keyboard, a microphone, a separate mobile computing device, etc. A display device 132 can include any device or group of devices suitable for providing visual, auditory, or other suitable sensory output. Non-limiting examples of the display device 132 include a touchscreen, a monitor, a separate mobile computing device, etc.

Although FIG. 8 depicts the input device 104 and the display device 132 as being local to the computing device that executes the image manipulation application 102, other implementations are possible. For instance, in some embodiments, one or more of the input device 104 and the display device 132 can include a remote client-computing device that communicates with the computing system 800 via the network interface device 810 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method in which one or more processing devices perform operations comprising:
   accessing a field of view (FOV) image that has a field of view less than 360 degrees and has low dynamic range (LDR) values;
   generating a lighting image based on lighting parameters estimated from a scene depicted in the FOV image;
   generating, using a mapping module, a set of features from a random noise signal;
   aggregating lighting features generated from the lighting image, image features generated from the FOV image, and the set of features generated from the random noise signal to generate aggregated features; and
   applying a machine learning model to the image features and the aggregated features to generate a panorama image having high dynamic range (HDR) values.

2. The computer-implemented method of claim 1, further comprising updating the lighting parameters based on a user input, wherein the lighting image is generated based on updated lighting parameters.

3. The computer-implemented method of claim 1, wherein applying a machine learning model to the image features and the aggregated features to generate a panorama image having high dynamic range (HDR) values comprises:
   applying a machine learning model to the image features and the aggregated features to generate a panorama image having low dynamic range (LDR) values; and
   combining the lighting image with the panorama image having the LDR values to generate the high dynamic range (HDR) values.

4. The computer-implemented method of claim 1, wherein the lighting image is a spherical Gaussian image.

5. The computer-implemented method of claim 1, wherein the panorama image represents a field of view of 360 degrees.

6. A system, comprising:
   a memory component;
   a processing device coupled to the memory component, the processing device to perform operations comprising:
      generating a lighting image based on lighting parameters for a scene depicted in a field of view (FOV) image, the FOV image having a field of view less than 360 degrees and low dynamic range (LDR) values;
      generating, using a mapping module, a set of features from a random noise signal;
      aggregating the set of features, lighting features generated from the lighting image, and image features generated from the FOV image to generate aggregated features; and
      generating a panorama image having high dynamic range (HDR) values based, at least in part, upon the image features and the aggregated features.

7. The system of claim 6, wherein the lighting parameters are specified by a user input or estimated from the scene and updated based on a user input.

8. The system of claim 6, wherein generate a panorama image having high dynamic range (HDR) values based, at least in part, upon the image features and the aggregated features comprises:

applying a machine learning model to the image features and the aggregated features to generate a panorama image having low dynamic range (LDR) values; and combining the lighting image with the panorama image having the LDR values to generate the high dynamic range (HDR) values.

9. The system of claim 8, wherein the machine learning model is a generative adversarial network (GAN) model.

10. The system of claim 6, wherein the lighting image is a spherical Gaussian image.

11. The system of claim 6, wherein the panorama image represents a field of view of 360 degrees.

12. A non-transitory computer-readable medium, storing executable instructions, which when executed by a processing device, cause the processing device to perform operations comprising:

accessing a field of view (FOV) image that has a field of view less than 360 degrees and has low dynamic range (LDR) values;

generating a lighting image based on lighting parameters estimated from a scene depicted in the FOV image;

a step for generating aggregated features based on the lighting image; and a step for applying a generative adversarial network (GAN) model to image features generated from the FOV image and the aggregated features to generate a panorama image having high dynamic range (HDR) values.

13. The non-transitory computer-readable medium of claim 12, wherein the operations further comprise: updating the lighting parameters based on a user input, wherein the lighting image is generated based on updated lighting parameters.

14. The non-transitory computer-readable medium of claim 12, wherein the operations further comprise: generating, using a mapping module, a set of features from a random noise signal, wherein the step for generating the aggregated features comprises aggregating lighting features generated from the lighting image, the image features, and the set of features.

15. The non-transitory computer-readable medium of claim 12, wherein the step for generating a panorama image having high dynamic range (HDR) values based on the image features and the aggregated features comprises:

combining the lighting image with the panorama image having the LDR values to generate the high dynamic range (HDR) values.

16. The non-transitory computer-readable medium of claim 12, wherein the lighting image is a spherical Gaussian image.

17. The non-transitory computer-readable medium of claim 12, wherein the panorama image represents a field of view of 360 degrees.

* * * * *